US009013502B2

(12) United States Patent
Ferguson

(10) Patent No.: US 9,013,502 B2
(45) Date of Patent: Apr. 21, 2015

(54) METHOD OF VIEWING VIRTUAL DISPLAY OUTPUTS

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 109 days.

(21) Appl. No.: 13/340,517

(22) Filed: Dec. 29, 2011

(65) Prior Publication Data

US 2013/0169826 A1 Jul. 4, 2013

(51) Int. Cl.
G09G 5/02 (2006.01)
H04N 9/67 (2006.01)
H04N 9/68 (2006.01)
H04N 9/74 (2006.01)
H04N 17/02 (2006.01)
H04N 17/04 (2006.01)

(52) U.S. Cl.
CPC .................. *H04N 17/02* (2013.01); *H04N 9/67* (2013.01); *H04N 9/68* (2013.01); *H04N 9/74* (2013.01); *H04N 17/04* (2013.01)

(58) Field of Classification Search
CPC ............ G09G 5/02; G09G 2320/0626; G09G 2320/0666; G09G 2320/0686; G09G 5/06; G09G 2340/06; H04N 1/60; H04N 1/6061; H04N 1/6058; H04N 1/6002; H04N 1/6008
See application file for complete search history.

(56) References Cited

U.S. PATENT DOCUMENTS

| 6,847,374 | B2 * | 1/2005 | Matsuda ........................ 345/589 |
| 8,520,023 | B2 * | 8/2013 | Sullivan et al. ............... 345/590 |
| 2002/0154138 | A1 * | 10/2002 | Wada et al. .................... 345/600 |
| 2006/0263758 | A1 | 11/2006 | Crutchfield, Jr. et al. |
| 2008/0055334 | A1 * | 3/2008 | Matsuoka et al. ............. 345/601 |
| 2011/0273451 | A1 * | 11/2011 | Salemann ....................... 345/427 |
| 2012/0287146 | A1 * | 11/2012 | Brown et al. .................. 345/590 |

FOREIGN PATENT DOCUMENTS

| EP | 2101313 A1 | 9/2009 |
| WO | 2008021660 A1 | 2/2008 |

OTHER PUBLICATIONS

European Search Report from EP No. 12198744.0, dated Jan. 20, 2014, 8 pages.

* cited by examiner

*Primary Examiner* — Antonio A Caschera
(74) *Attorney, Agent, or Firm* — Marger Johnson & McCollom PC

(57) ABSTRACT

A method for viewing a simulated light output generated for a first display on a second display includes a variety of steps. First, the simulated light output is generated based on qualities of the first display. Next, the simulated light output is compensated for color differences, temporal differences, luminance differences including gamma difference, and differences in viewing environment between the first and the second display, in real-time. Then, the simulated light output that has been compensated for the differences and for viewing environment is output for the second display.

10 Claims, 3 Drawing Sheets

$$Xf(x, y, Y) := if\left(y > 0, \frac{x}{y} \cdot Y, 0\right) \qquad Zf(x, y, Y) := if\left(y > 0, \frac{1 - x - y}{y} \cdot Y, 0\right)$$

$XrDefault(Y) := Xf(xr, yr, Y)$ $ZrDefault(Y) := Zf(xr, yr, Y)$ $XgDefault(Y) := Xf(xg, yg, Y)$ $ZgDefault(Y) := Zf(xg, yg, Y)$ $XbDefault(Y) := Xf(xb, yb, Y)$ $ZbDefault(Y) := Zf(xb, yb, Y)$ $XwDefault := XrDefault(Yr) + XgDefault(Yg) + XbDefault(Yb)$ $ZwDefault := ZrDefault(Yr) + ZgDefault(Yg) + ZbDefault(Yb)$ $YwDefault := Yr + Yg + Yb$ $XwTarget := Xf(xwUI, ywUI, YwDefault)$ $YwTarget := YwDefault$ $ZwTarget := Zf(xwUI, ywUI, YwDefault)$ Constraint equations:

$$M\_XYZ2wrwgwb := \begin{bmatrix} XrDefault(Yr) & XgDefault(Yg) & XbDefault(Yb) \\ Yr & Yg & Yb \\ ZrDefault(Yr) & ZgDefault(Yg) & ZbDefault(Yb) \end{bmatrix}^{-1}$$

$$\begin{bmatrix} wr \\ wg \\ wb \end{bmatrix} := M\_XYZ2wrwgwb \cdot \begin{bmatrix} XwTarget \\ YwTarget \\ ZwTarget \end{bmatrix}$$

normalize to maximum: $\quad wi := 0..2 \quad wt_{wi} :=$ $$\begin{bmatrix} wr \\ wg \\ wb \end{bmatrix}$$

$$wtnorm_{wi} := \frac{wt_{wi}}{max(wt)}$$

WHITE POINT CALIBRATION

FIGURE 2

METHOD OF VIEWING VIRTUAL DISPLAY OUTPUTS

FIELD OF THE INVENTION

This disclosure is directed toward to video systems, and, more particularly, to a system and method that accurately displays images on a target device.

BACKGROUND

It is sometimes difficult to evaluate video on a device, or even a machine structured to evaluate video when a simulated output cannot be accurately viewed on an attached display. For instance, a video engineer may wish to see how a particular video would look to a viewer watching a consumer LCD (Liquid Crystal Display) television, a producer viewing a studio CRT (Cathode Ray Tube), an engineer in a broadcast center, or an engineer in a product development laboratory. Currently some quality analyzers, such as the picture quality analyzer PQA500 from Tektronix of Beaverton, Oreg. incorporates display models, simulating light and the human vision system in order to quantify differences for these types of applications. However, there is no way for users of such quality analyzers to directly experience the perceptual stimuli that are simulated. Instead, the video is rendered on the display that is used in conjunction with the quality analyzer. Further, display manufacturers have an unmet need to be able to automatically evaluate virtual designs, before a product is built. However, without being able to directly see the differences among display design options, much useful information is hidden from the display engineers.

Although mathematical solutions exist for converting video from one color space to another, such as YCbCr to RGB to CIE 1931 XYZ linear light representation, such solutions do not take into account various display variation from standard RGB. For instance, XYZ coordinates of the purest red, green, or blue represented by the digital video may not match the corresponding XYZ coordinates on the end display. Further, these relationships do not account for a mis-match in gamma values, i.e., a parameter used to represent the non-linear transfer function between the input signal and output light intensity, because the equivalent gamma of a display may not match the gamma in any corresponding standard.

Even in cases where the primaries and gamma do match a standard, such as SMPTE-C for standard definition, or ITU 709 for high definition video, white point calibration is often intentionally set to a non-default value. For instance, a computer monitor typically set at 9500° default color temperature may instead have its white point set to 6500° to match a television default color temperature. This white point calibration allows a display with one set of primaries to come close to looking like a display with another set of primaries. However, such conversion is not included in the color conversion formulae mentioned above, and does so by shifting colors in a way that many colors in the gamut are lost.

Other potential solutions require expensive and specialized equipment to physically measure output from a first display to create a conversion process from a first to a second display, which is expensive, complex, and too computationally intensive to provide a generalized solution. In addition, it requires an actual display to be measured, and not a modeled display. Further, no system, including the direct measuring systems, includes a way to compensate for response times of LCDs between the end of a video frame and the beginning of a next one. This leads to unacceptable and sometimes very perceptible display artifacts, such as motion blur.

Embodiments of the invention address this and other limitations of the prior art.

SUMMARY OF THE INVENTION

A system using reverse modeling of a target display type converts simulated light output into a signal that, when rendered on the target display, produces a perceptual response equivalent or nearly equivalent to that of the original simulated light. Further, methods are provided that can adapt to a given available display so that when rendered on the available display, the perceived image closely represents the perceived image of the simulated light or a virtual image.

Particular embodiments of the invention are directed to methods for viewing a simulated light output generated for a selected display type on a second display. The method includes first generating the simulated light output based on qualities of the first display type. Next the simulated light output is compensated for viewing environment of the second display in real-time. After the compensation is complete, the simulated light output that has been compensated is output for the second display.

BRIEF DESCRIPTION OF THE DRAWINGS

FIG. 2 is a series of equations for calculating weights for white balance calculation used in embodiments of the invention.

DETAILED DESCRIPTION

Figure 1:
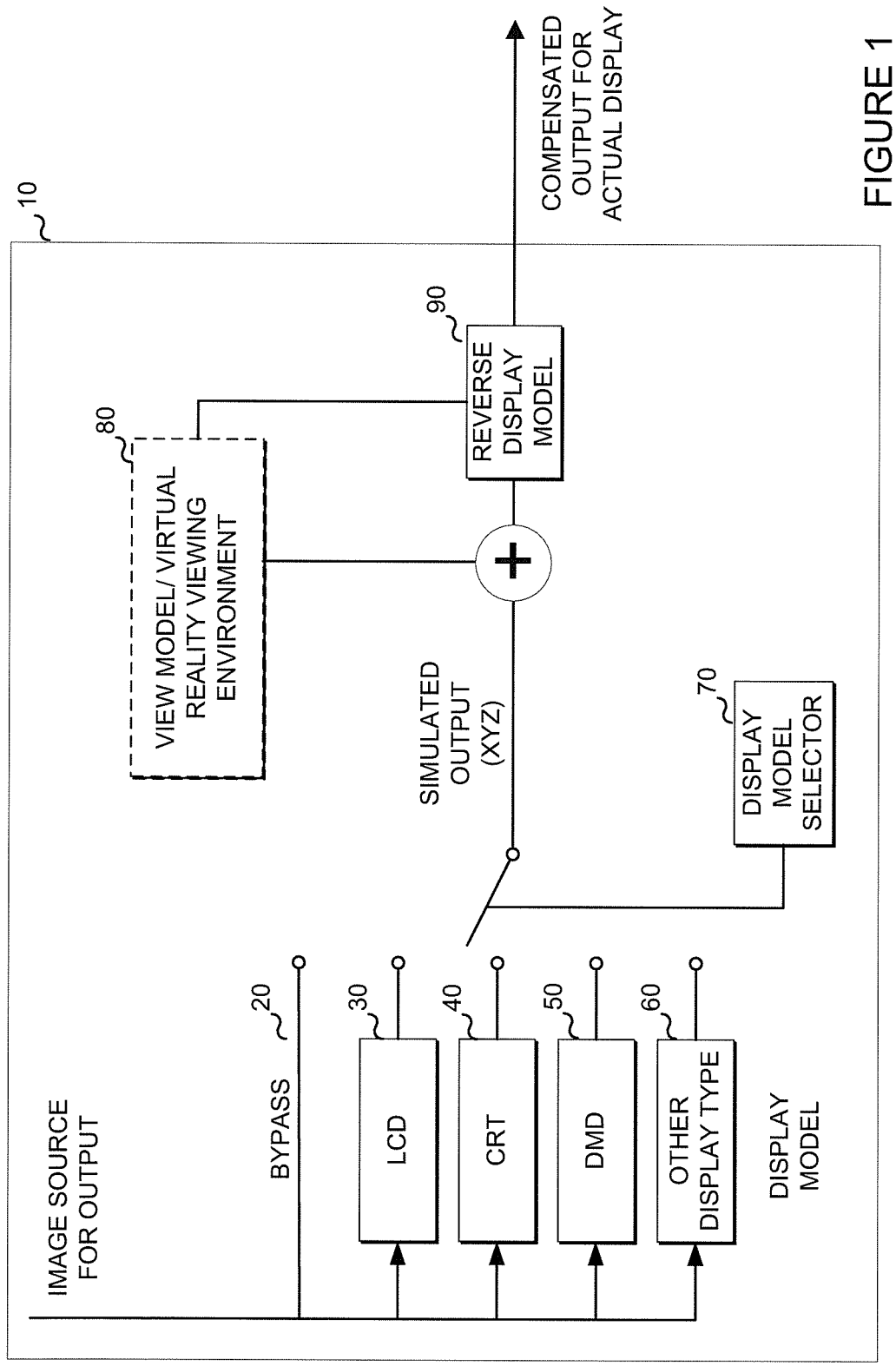
FIG. 1 is a functional block diagram of a system for generating a compensated video output according to embodiments of the invention.

FIG. 1 is a functional block diagram of a system 10 for generating a compensated video output according to embodiments of the invention. An image source, such as a video, virtual-reality images, or other images is provided to a display model that includes modeling information specific for selected types of displays. A display model selector 70 may select, for instance, an LCD display model 30, CRT display model 40, DMD (Digital Micromirror Device) display model 50, or other display model 60. Also, the display model selector 70 may bypass the display model selection completely by choosing the bypass mode 20.

Display models 30-60 include various data, such as color data, white balance, gamma information, etc., about a particular type of display. Display models may include translations from one particular color space to another, with particular parameters specific to the particular display model type. For video applications, digital video streams and files commonly use YCbCr tristimulus representation as per ITU-R BT.601 for standard definition video and ITU-R BT.709 for high definition video, or in some cases RGB. For digital cinema, direct XYZ representation is already directly supported as per the DCI (Digital Cinema Initiatives) "Digital Cinema System Specification," commonly referred to as the "DCI Specification."

Display Model Color Conversion

Conversion of YCbCr to RGB (and to XYZ)

For SD and HD video, translation of YCbCr to XYZ may be done as follows:

1) Initialization of the color model:
   a) White point cal: Using RGB and White CIE1931 xyY coordinates given either by:
      i) a standard such as according to 601, 709, SMPTE-C, EBU or whatever best represents the appropriate display to be simulated); or
      ii) Custom user defined xr,yr,Yr xg,yg,Yg, xb,yb,Yb, xw,yw,Yw.
   b) Calculate the required weights {wr,wg,wb} applied to R,G and B in order to achieve the given white point (xw,yw,Yw) for R=G=B.
   c) Calculate light conversion matrix for RGB to XYZ conversion, as described below
   d) LUT (Look Up Table) initialization:
      i) First, use respective standard translations of YCbCr to pre-gamma RGB {ER,EG,EB} using matrix defined by respective colorimetry standard (601, 709, etc.);
      ii) Convert {ER,EG,EB} to light {R,G,B} using contrast, gamma and brightness parameters;
      iii) Apply weights {wr,wg,wb} to {R,G,B};
      (For LCD, end LUT calc. here).
      iv) Convert weighted RGB light to XYZ using a matrix
   2a) For CRT & DMD, convert YCbCr directly to XYZ using a LUT or direct calculation, depending on the implementation.
   2b) For LCD, convert YCbCr to {wr*R,wg*G,wb*B} using a LUT or direct calculation, depending on the implementation, then use RGB to XYZ conversion matrix to finish conversion.

For luminance only processing, i.e., without color, each display model technology has a unique initialization function for such things as creating look-up tables, setting filter parameters (for LCD), etc. It is within these functions that the following color model initialization takes place. Initialization of the color model includes the initialization of white point calibration weights {wr,wg,wb} along with any required look-up tables.

Display Model Using LUTs for Color Conversion

Converting color data from YCbCr to XYZ may be performed directly using general computation circuitry or equivalent functions. For instance, first, a conversion of YCbCr to ER,EG,EB, according to standards, would use 9 multiplys and 6 adds. Applying a gamma factor to the result then uses 3 exponentials. Applying weights to create a white point may take a further 3 multiplys. Finally, a conversion of RGB light to XYZ (RGB Vector*matrix) takes another 9 multiplys and 5 adds, for a total of 18 multiplies, 12 adds, and 3 exponentials.

Using a Look Up Table (LUT), however, to perform equivalent color compensation, would only use 2 shifters, 2 adders, and 1 table access, and is therefore an attractive option to use fewer resources. Of course, the display model would need to include memory to store the LUT, but this is typically quite a reasonable tradeoff. Embodiments of the invention may use any method for color conversion, of course, and the choice of which method to use is typically an implementation choice.

For CRT and DMD, a direct YCbCr to XYZ conversion may be performed by the use of a LUT, the size of which depending on bit depth. For example, for 8 bit video depth, the number of memory locations for the LUT would be on the order of $6.7 \times 10^7$ bits, which is a practical implementation given present day storage costs. 10 bit video depth and 12 bit video depth would require LUT sizes on the order of $4.3 \times 10^9$ bits, and $2.7 \times 10^{11}$ bits, which is currently not practical for typical implementations.

For LCD, the color conversion is made from YCbCr to RGB (light), because temporal processing for LCDs, as described below, occurs in RGB light space. The size of a LUT for LCD processing is the same as for CRTs and DMDs at the same bit depths.

Display Model Using Trilinear Interpolation for Color Conversion

It is possible to perform a trilinear interpolation for color conversion as well, but may not be a practical consideration given the fact that other conversion, such as direct computation, may be more efficient.

Conversion of YCbCr to ER,EG,EB

YCbCr is converted to ER,EG,EB according to the corresponding colorimetry standard (601, 709, etc.)

Conversion of ER,EG,EB to RGB (Light)

The value of normalized (to unity) ER, EG, and EB values are converted to normalized (to unity) RGB light values using gamma, contrast and brightness controls, effectively reusing a luminance model already existing in quality analyzers by applying it to each primary color channel. The subsequent RGB to XYZ light conversion takes into account the actual luminance levels of each.

Display Model White Point Calibration

White is represented as equal "electrical signal" amplitudes of R,G and B. However, when the white point selected (by a standard or a user selecting a non-standard color temperature or other color coordinates) does not coincide with is combination of the R,G and B light output from the display, white point calibration is usually performed. In effect, white point calibration weights R,G and/or B light output such that the amplitudes are altered in order to achieve the white point. These weights, {wr,wg,wb} are calculated during display model initialization.

Using RGB and White CIE1931 xyY coordinates for R,G,B and W (xr,yr,Yr xg,yg,Yg, xb,yb,Yb, xw,yw,Yw), the required weights {wr,wg,wb} may be calculated and applied to light outputs for R,G and B in order to achieve the given white point (xw,yw,Yw) for electrical signal R=G=B. Given the above and that limits (here normalized to 1) of max and min R, G and B, find the relative ratios of RGB such that the given white point is achieved. Calculation of the weights {wr,wg,wb} may be performed as illustrated in FIG. 2.

Next, white points can be calibrated by using RGB and White CIE1931 xyY coordinates given either by:
   Standards such as according to 601, 709, SMPTE-C, EBU or whatever best represents the appropriate display to be simulated) or
   Custom user defined xr,yr,Yr xg,yg,Yg, xb,yb,Yb, xw,yw, Yw Verification of white point calibration may be performed by the use of colorless (achromatic) video such as all white video (RGB with all channels equal to max white (235) or YCbCr with Y=235, Cb=Cr=128, etc.). The XYZ output of the display model should be equal to XwTarget, YwTarget and ZwTarget respectively.

Display Model Chromaticity Coordinates of Primary Colors and Whites

Note that Y values for R,G,B and W (Yr,Yg,Yb,Yw) depend on the 1) choice of gamma, 2) maximum luminance value and 3) the light R,G,B to Y conversion. The first two parameters are already included in the already existing luminance only display models in quality analyzers. The third set of 3 weights for R,G and B respectively will generally be calculated from the coordinates of the primaries and white point along with the first two parameters. However, the RGB to Y conversion is also defined within many standards (i.e. ITU.B-709 HD) via the matrix to convert RGB to XYZ.

Including explicit values from each standard, such as ITU.B-709 HD, SMPTE-C, EBU, NTSC, and SMPTE-240M would be redundant, since direct calculation gives the same results for Y, as described below.

Display Model Temporal Filtering for LCDs

The most general display model of LCD technology includes temporal filtering to represent the "zero order hold" aspect of constant or high duty cycle backlighting, or reflected light during the time between frame transitions. In order to model this, a temporal filter is applied to the simulated light output for the luminance only model (applied to Y). For a full color model, this filter is instead applied to RGB (light primaries) outputs prior to conversion to XYZ.

Advanced LCD configuration includes the use of modulated backlight. Modern LCD displays include backlight modulation to mitigate the motion blur problem associated with even theoretical 0 response time technology. The temporal filtering would be modified accordingly: In order to model steady backlight or reflected light, the temporal filter is the cascade of a zero-order hold filter (=0 response time step function change in luminance at each frame transition) and simple low-pass filter representing the response time. In order to model backlight modulation, parameters such as the duty cycle and phase of the backlight on-off and off-on transitions are received as display specifications. The temporal filter is updated accordingly, with the simulated results tracking the real results of greatly mitigated motion blur. For low duty cycle (back or reflected) light, especially raster scanned methods that mimic CRT's, the temporal filter may be eliminated since the integration in the human eye (accounted for in the human vision model) will sufficiently attenuate remaining high frequency information.

Matrix Conversion from RGB (Light) to XYZ

A calculation of initialization of matrix M_RGBlight2XYZ is initialized during the display initialization as follows:

$$M\_RGBlight2XYZ2 := \begin{bmatrix} \frac{xr}{yr} \cdot Yr \cdot wtnorm_0 & \frac{xg}{yg} \cdot Yg \cdot wtnorm_1 & \frac{xb}{yb} \cdot Yb \cdot wtnorm_2 \\ Yr \cdot wtnorm_0 & Yg \cdot wtnorm_1 & Yb \cdot wtnorm_2 \\ \frac{1-xr-yr}{yr} \cdot Yr \cdot wtnorm_0 & \frac{1-xg-yg}{yg} \cdot Yg \cdot wtnorm_1 & \frac{1-xb-yb}{yb} \cdot Yb \cdot wtnorm_2 \end{bmatrix}$$

Noting that the weighted sum of R=1, G=1, B=1 should result in Y=1: c:=0 . . . 2

$$M\_RGBlight2XYZnorm := \frac{M\_RGBlight2XYZ2}{\sum_c M\_RGBlight2XYZ2_{1,c}}$$

An example matrix calculation using SMPTE C and wtnorm[i]=1 is given below, using 100 nits as the maximum luminance level. Note that the maximum luminance level does not matter for the normalized matrix.

$$M\_RGBlight2XYZ2 = \begin{bmatrix} 39.356 & 36.528 & 19.166 \\ 21.24 & 70.11 & 8.656 \\ 1.874 & 11.194 & 95.83 \end{bmatrix}$$

$$M\_RGBlight2XYZnorm = \begin{bmatrix} 0.3935 & 0.3653 & 0.1916 \\ 0.2124 & 0.7011 & 0.0866 \\ 0.0187 & 0.1119 & 0.9582 \end{bmatrix}$$

$$\sum_c M\_RGBlight2XYZnorm_{1,c} = 1$$

Compare this numerical example with the corresponding coefficients taken from SMPTE-C:

$$X\_smptec(R,G,B) := 0.3935 \cdot R + 0.3653 \cdot G + 0.1916 \cdot B$$

$$Y\_smptec(R,G,B) := 0.2124 \cdot R + 0.7011 \cdot G + 0.0866 \cdot B$$

$$Z\_smptec(R,G,B) := 0.0187 \cdot R + 0.1119 \cdot G + 0.9582 \cdot B$$

View Model

Referring back to FIG. 1, an optional view model or virtual reality viewing environment 80 may add a factor to the output of the selected display model type to more accurately reflect the viewing environment of the display. For example, information about the ambient light, reflected light, or other simulated light may be added linearly to the XYZ representation of the display, using a CIE XYZ representation of the added light information. This view model information is used to modify the predicted picture/video quality rating.

Additionally, any virtual environment aspect may also be similarly included in the view model, also by using the CIE XYZ representation of such added information. Such information may include relatively basic information, for example, information about the display bezel of the display device, or may be as complex as a detailed virtual reality rendering.

Figure 3:
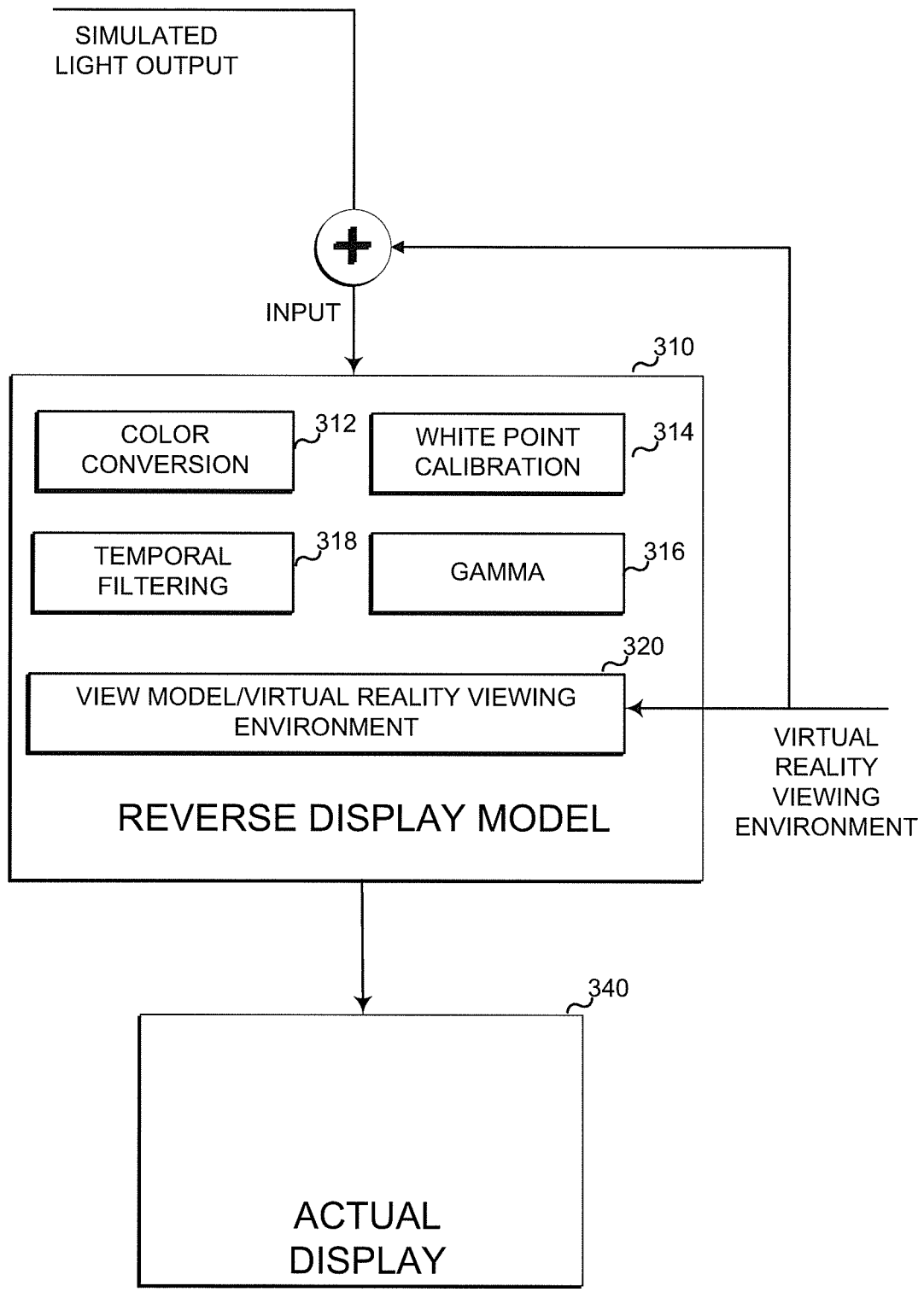
FIG. 3 is a functional block diagram of a system for viewing virtual display outputs according to embodiments of the invention.

FIG. 3 is a functional block diagram of a system for viewing simulated or virtual display outputs according to embodiments of the invention, providing additional detail about the reverse display model 90 of FIG. 1.

A reverse display model 310 of FIG. 3 may be an example embodiment of the reverse display model 90 of FIG. 1. The reverse display model 310 includes facilities for color conversion 312, white point calibration 314, gamma 316, temporal filtering 318, and a view model 320. The components of the reverse display model 310 of FIG. 3 are similar or identical to their counterpart components in the (forward) display models described above. The various factors included within components or sections of the reverse display model 310 may be pre-stored within the display model. In the case that the actual display 340 is known, the particular factors specific to the actual display 340 may be selected, for example as a menu choice on the system. In other embodiments the actual display 340 may identify itself to the system, and a look-up performed to select the appropriate factors for the reverse display model 310.

The reverse display model 310, in contrast to the standard display models 30-60 of FIG. 1, operates in "reverse." In other words, from the XYZ simulated light representation of an image to be evaluated, which was generated for a selected target display type, conversion to standard video representation (which can include XYZ representation) for the actual display 340 is performed. For target displays 340 that do not support XYZ, the inverse of XYZ to RGB light (using the primaries of the actual display to be used), inverse gamma function, and any further conversion (such as standard conversion to YCbCr) may be performed from respectively inverting the matrices and functions described above.

In operation, as a simulated light output is generated, for instance, from video, imaging, or virtual reality, it is optionally passed through a display model for a particular selected display type. The simulated output is then passed to a reverse display model for an actual display, the reverse display model including a compensator for adapting the simulated output to the actual display, so the image viewed on the actual display is as close as possible to the perceived image represented by the virtual or simulated light. The compensations may include display primary (color) compensation and equivalent gamma compensation, white point calibration, temporal characteristics, and viewing environment of the actual display. The viewing environment may include color and brightness of surroundings and ambient light, and may also include a generated virtual reality viewing environment that includes other images. The compensations change in real time as the simulated light output, actual display viewing environment, and virtual reality environment changes.

In a preferred embodiment, the actual display 340 used for viewing has sufficient if not superior color gamut, maximum luminance, response time, contrast (black level), and other specifications to accurately render the input image. Also, ideally, the viewing conditions will also allow for accurate perception of the rendered image. For example, the ambient light will be sufficiently low as to not raise the effective black level or move the perceived white point (chromatic shift) beyond target accuracy.

Although many of the embodiments described above include a user interface, it will be appreciated that in other embodiments, those parameters may alternatively be determined automatically by a test and measurement instrument In various embodiments, components of the invention may be implemented in hardware, software, or a combination of the two, and may comprise a general purpose microprocessor, a digital signal processor (DSP), an application specific integrated circuit (ASIC), a field-programmable gate array (FPGA), or the like.

It will be appreciated from the forgoing discussion that the present invention represents a significant advance in the field of display modeling. Although specific embodiments of the invention have been illustrated and described for purposes if illustration, it will be understood that various modifications may be made without departing from the spirit and scope of the invention. Accordingly, the invention should not be limited except as by the appended claims.

What is claimed is:

1. A method for viewing a simulated light output generated for a first display type on a second display, the method comprising:
   receiving an image source;
   selecting via a display model selector a display model of the first display type;
   a processor generating for the selected display model the simulated light output based on qualities of the first display type by converting the image source to a pre-gamma RGB image, and converting the pre-gamma RGB to the simulated light output using matrix manipulation, wherein gamma is a parameter that represents the non-linear transfer function between the input signal and output light intensity;
   the processor compensating the simulated light output for a viewing environment of the second display; in real time based on the viewing environment and gamma compensation, in which the viewing environment includes color and brightness of surroundings and ambient light of the second display and virtually reality created viewing environment;
   the processor updating the compensation of the simulated light output for the viewing environment of the second display based on changes in the viewing environment in real time; and
   the processor outputting the simulated light output that has been compensated for color differences and for viewing environment to the second display.

2. The method of claim 1, further comprising:
   compensating the simulated light output for color differences between the first and the second display.

3. The method of claim 1 in which the color differences are compensated using matrix manipulation.

4. The method of claim 1, further comprising:
   compensating the simulated light output by applying a temporal filter before providing it to the second display.

5. A device for generating simulated light output, the simulation device comprising:
   an input configured to receive an image source;
   a display model selector configured to select a display model of the first display type;
   a processor, including
      a generator for generating for the selected display model a simulated light output based on qualities of a first display by converting the image source to a pre-gamma RGB image, and converting the pre-gamma RGB to the simulated light output using matrix manipulation, wherein gamma is a parameter that represents the non-linear transfer function between the input signal and output light intensity, and
      a reverse display model structured to compensate the simulated light output for differences between the first display and a second display in real time based on viewing environment and gamma compensation, in which the reverse display model comprises a view model of the second display that accepts the viewing environment including color and brightness Of surroundings and ambient light of the second display and a virtual reality generator viewing environment, and to update the compensation of the simulated light based on changes in the viewing environment in real time; and
   a second display for viewing the compensated simulated light output.

6. The device of claim 5, in which the reverse display model comprises a color conversion facility.

7. The device of claim 5, in which the reverse display model comprises a white point calibration facility.

8. The device of claim 5, in which the reverse display model comprises a temporal filter.

9. The device of claim 5, in which the virtual reality generator is a component of the device for generating simulated light output.

10. A method for viewing a simulated light output generated for a first display type on a second display, the method comprising:

receiving an image source;
selecting via a display model selector a display model of the first display type;
generating for the selected display model via a processor a simulated light output of the image source based on the qualities of the first display type, by converting the image source to a pre-gamma RGB image, and converting the pre-gamma RGB to the simulated light output using matrix manipulation, wherein gamma is a parameter that represents the non-linear transfer function between the input signal and output light intensity; and
compensation via the processor the simulated light output for a viewing environment of the second display in real time based on the viewing environment of the second display and a gamma compensation, in which the viewing environment includes a color and brightness of surroundings and ambient light of the second display.

* * * * *

UNITED STATES PATENT AND TRADEMARK OFFICE
CERTIFICATE OF CORRECTION

PATENT NO. : 9,013,502 B2  
APPLICATION NO. : 13/340517  
DATED : April 21, 2015  
INVENTOR(S) : Kevin M. Ferguson Page 1 of 1

It is certified that error appears in the above-identified patent and that said Letters Patent is hereby corrected as shown below:

Claims
In column 8, line 6, replace "and gamma" with -- and a gamma --;
In column 8, line 9, replace "virtually reality" with -- virtual reality --;
In column 8, line 16, replace "for viewing" with -- for the viewing --;
In column 8, line 26, replace "A device" with -- A simulation device --;
In column 8, lines 44-45, replace "on viewing" with -- on a viewing --;
In column 8, line 45, replace "and gamma" with -- and a gamma --;
In column 9, line 12, replace "compensation" with -- compensating --.

Signed and Sealed this
Twenty-second Day of March, 2016

Michelle K. Lee
*Director of the United States Patent and Trademark Office*